United States Patent
Sueoka et al.

(10) Patent No.: US 7,588,713 B2
(45) Date of Patent: *Sep. 15, 2009

(54) METHOD OF MANUFACTURING RESIN BOOTS FOR CONSTANT VELOCITY UNIVERSAL JOINT

(75) Inventors: Kazuhiko Sueoka, Ageo (JP); Yasuji Takada, Ageo (JP)

(73) Assignee: Fukoku Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/396,520

(22) Filed: Mar. 26, 2003

(65) Prior Publication Data

US 2004/0159976 A1    Aug. 19, 2004

(30) Foreign Application Priority Data

Feb. 19, 2003    (JP)    ............................. 2003-041317

(51) Int. Cl.
    B29C 45/14    (2006.01)
(52) U.S. Cl. .................... 264/328.8; 264/266; 264/275; 264/255; 264/259
(58) Field of Classification Search ............. 264/328.9, 264/328.8, 241, 250, 255, 259
    See application file for complete search history.

(56) References Cited

U.S. PATENT DOCUMENTS

| | | | | |
|---|---|---|---|---|
| 4,341,317 A * | 7/1982 | Suzuki et al. | ................. | 215/42 |
| 5,236,656 A * | 8/1993 | Nakajima | ................... | 264/506 |
| 5,529,538 A * | 6/1996 | Schulz et al. | ............... | 464/111 |
| 5,851,471 A * | 12/1998 | Schloss et al. | .............. | 264/250 |
| 5,900,205 A * | 5/1999 | Sadr et al. | ................... | 264/531 |
| 6,171,534 B1 * | 1/2001 | Leach et al. | ................ | 264/102 |
| 6,402,999 B1 * | 6/2002 | Sadr et al. | ..................... | 264/68 |

(Continued)

FOREIGN PATENT DOCUMENTS

CA    2246469    9/1998

(Continued)

OTHER PUBLICATIONS

Rosato, Dominick V., Donald V. Rosato, and Marlene G. Rosato. Injection Molding Handbook (3rd edition). Boston: Kluwer Academic Publishers, 2000. pp. 289, 334, 1252-1253, 1257.*

(Continued)

Primary Examiner—Monica A Huson
(74) Attorney, Agent, or Firm—Rader, Fishman & Grauer, PLLC (57) ABSTRACT

Resin boots for constant velocity universal joint in which a different thickness portion is integrally formed in an inner diameter of a large diameter side end portion of a primarily molded resin bellows in accordance with a secondary molding. A resin bellows constituted by a bellows portion, and a small diameter side end portion and a large diameter side end portion which are provided in both end sides of the bellows portion is molded in accordance with a primary molding, and a different thickness portion corresponding to a secondarily molded product is integrally formed in an inner periphery of the large diameter aide end portion of the primarily molded resin bellows by being secondarily molded within an injection metal mold. At this time, a molten material of the different thickness portion is injected into a secondary molding space from an optional position of a thin portion.

5 Claims, 6 Drawing Sheets

U.S. PATENT DOCUMENTS

| | | | |
|---|---|---|---|
| 6,660,206 B1 * | 12/2003 | Matsushima et al. | 264/255 |
| 6,682,678 B2 * | 1/2004 | Gross | 264/242 |
| 6,695,706 B2 * | 2/2004 | Furuta | 464/175 |
| 6,832,763 B2 * | 12/2004 | Huchet et al. | 277/634 |
| 2002/0160074 A1 * | 10/2002 | Saito et al. | 425/525 |
| 2005/0046077 A1 * | 3/2005 | Sueoka et al. | 264/259 |
| 2005/0046078 A1 * | 3/2005 | Sueoka et al. | 264/267 |

FOREIGN PATENT DOCUMENTS

| | | |
|---|---|---|
| EP | 0924450 A2 | 6/1999 |
| EP | 0924450 A3 | 6/1999 |
| JP | 2-22463 | 2/1990 |
| JP | 2002-286048 | 10/2002 |

OTHER PUBLICATIONS

Catalogue "Constant Velocity Universal Joints or Automobiles", Cat. No. 5601-II/JE, p. 9, Issued Feb. 3, 2000 by NTN Co., Ltd.

* cited by examiner

ARRANGING CORE MOLD WITHIN LARGE DIAMETER SIDE END PORTION OF BELLOWS AS WELL AS HOLDING RESIN BELLOWS WITHIN METAL MOLD (FIRST STEP)

FORMING SECONDARY MOLDING SPACE BETWEEN INNER SURFACE OF LARGE DIAMETER SIDE END PORTION OF RESIN BELLOWS AND OUTER PERIPHERAL SURFACE OF CORE MOLD (SECOND STEP)

POSITIONING MOLTEN MATERIAL INJECTING POINT FOR SECONDARY MOLDING IN THIN PORTION MOLDING SPACE (THIRD STEP)

INJECTING AND CHARGING MOLTEN MATERIAL INTO SECONDARY MOLDING SPACE (FOURTH STEP)

METHOD OF MANUFACTURING RESIN BOOTS FOR CONSTANT VELOCITY UNIVERSAL JOINT

BACKGROUND OF THE INVENTION

1. Field of the Invention

The present invention relates to resin boots for constant velocity universal joint used in a state of being firmly fixed to an outer peripheral surface of a tripod joint an outer periphery of which is formed in a concavo-convex shape, in a constant velocity universal joint, for example, used in a drive shaft and a propeller shaft for transmitting a power from an engine of a motor vehicle to a tire.

2. Prior Art

The tripod joint has recess portions formed in desired portions on the outer peripheral surface for various purposes comprising a thin forming, a weight saving and the like.

In the resin boots for constant velocity universal joint used in a state of being firmly fixed to the outer peripheral surface of the constant velocity universal joint, a bellows portion thereof plays a part in a cover and also a part in bending in correspondence to a motion of the drive shaft, the propeller shaft or the like, and an end portion thereof is firmly fixed to the outer periphery of the constant velocity universal joint via a band and plays a part in an oil (grease) seal and dust seal.

Accordingly, it is necessary to form an inner periphery of the end portion of the boots in a shape closely attached so as to be aligned with the outer periphery of the tripod joint (a joint outer race or the like), and since the tripod joint has the recess portion formed in the outer periphery thereof as described above, it is necessary that the end portion in a large diameter side firmly fixed to the outer periphery is formed in an inner peripheral shape having different thickness portions.

Figure 7A:
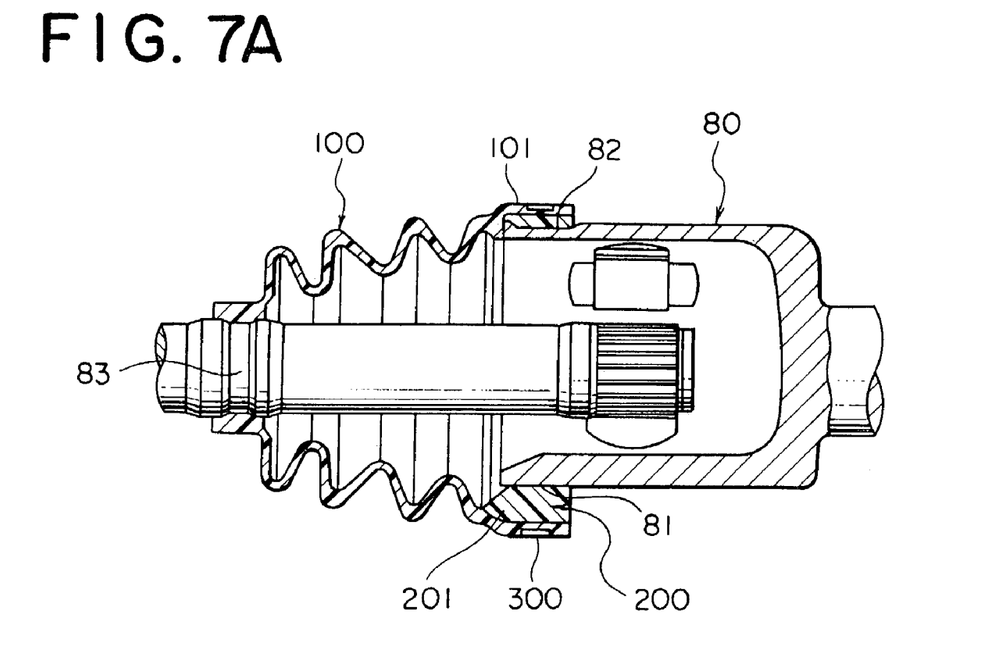
FIG. 7A is a vertical cross sectional side elevational view of a state in which conventional resin boots for constant velocity universal joint is mounted to a tripod joint.
Figure 7B:
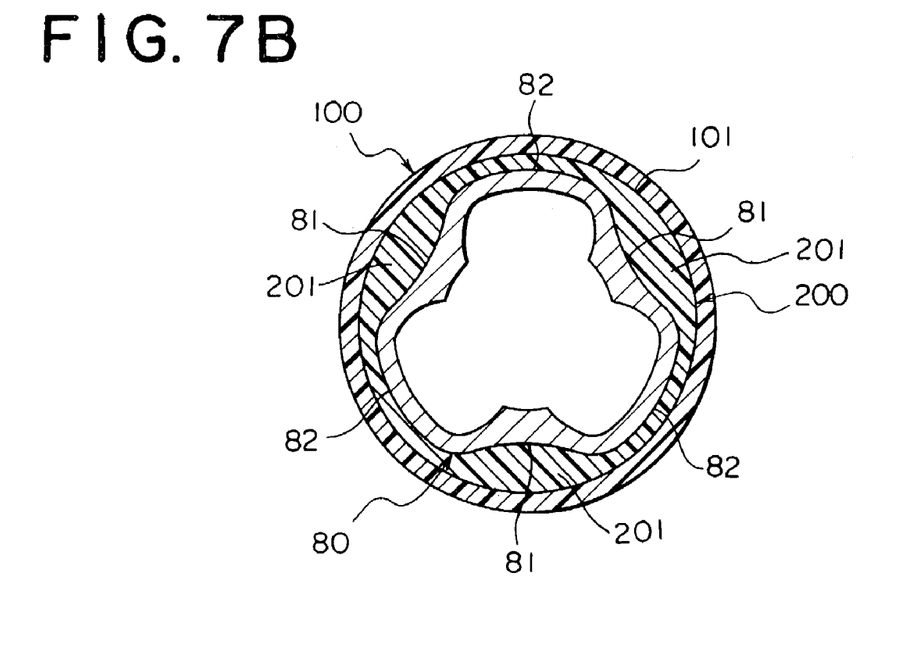
FIG. 7B is a front elevational view of a state of being cross sectioned at a position of the large diameter side end portion of the boots for the constant velocity universal joint in a state in FIG. 7A.

In conventional, as the boots for the constant velocity universal joint used in the tripod joint, there has been known a structure shown in FIG. 7 (for example, refer to non-patent document 1).

This conventional structure is constituted by a resin bellows 100 which is formed, for example, by an injection blow molding and has a uniform thickness in a large diameter side end portion 101, and a rubber grommet 200 which has an outer diameter fitted to an inner surface of the large diameter side end portion 101 of the resin bellows 100, is formed in a circular ring shape, and has thickness portions 201 protruding in an inner diameter direction every fixed intervals, is provided so as to fit an outer periphery of the grommet 200 independently formed as mentioned above to the inner periphery of the large diameter side end portion 101 of the bellows 100 and fit an inner periphery of the grommet 200 to an outer periphery of the tripod joint 80, and is fastened and firmly fixed to the outer periphery of the tripod joint 80 from the outer peripheral side of the large diameter side end portion 101 by a fastening device such as a band 300 or the like.

Further, there is a prior art document that a grommet and a bellows are integrally formed within a metal mold by previously forming a resin grommet having thickness portions protruding in an inner diameter direction every fixed intervals, holding the grommet within the metal mold and thereafter injection molding or blow molding the resin bellows (for example, refer to patent document 1 and patent document 2).

Non-patent document 1

Catalogue "Constant Velocity Universal Joints or Automobiles" (CAT. No. 5601-II/JE) page 9, issued on Feb. 3, 2000 by NTN Co., Ltd.

Patent document 1

Japanese Unexamined Utility Model Publication No. 2-22463

Patent document 2

Japanese Unexamined Patent Publication No. 2002-286048

However, as the structure described in FIG. 7, in accordance with the prior art mentioned above in which the bellows 100 and the grommet 200 are independently formed and are fitted and assembled, there is a problem in a grease leakage and an assembling operability. That is, if the fitting work is carelessly carried out at a time of fitting the grommet 200 to the inner periphery of the bellows large diameter side end portion 101, a displacement is generated between both elements. Further, it is possible to outward fit the bellows large diameter side end portion 101 after fitting the grommet 200 to the outer periphery of the tripod joint 80, however, there is a risk that the displacement is generated between the bellows large diameter side end portion 101 and the grommet 200, thereby generating the grease leakage, if the carelessness exists.

Further, in the prior art disclosed in patent document 1 or 2, since no specific technical means is provided in the portion in which the grommet and the bellows are integrally formed, both elements are not securely welded even if they are integrally formed on the surface. Accordingly, the portion which is expected to be integrally formed peels off, so that there is generated a problem such as the grease leakage or the like.

Accordingly, the inventors of the present application have paid attention to a dichroic molding, and have succeeded in developing a new useful method of secondarily forming a different thickness portion in the inner periphery of the large diameter side end portion of the resin bellows which is previously formed in accordance with a primary molding.

SUMMARY OF THE INVENTION

The present invention is made by taking the problem mentioned above in the conventional art into consideration, and an object of the present invention is to provide resin boots for a resin constant velocity universal joint in which a different thickness portion is integrally formed in an inner diameter of a large diameter side end portion of a primarily molded resin bellows in accordance with a secondary molding.

In order to achieve the object mentioned above, a technical means achieved by the present invention is structured such that an independently primary molded resin bellows is set within an injection molding metal mold, and the different thickness portion is integrally molded on an inner surface of a large diameter side end portion by injecting and charging a molten material (for example, a thermoplastic resin or the like) into a secondary molding space formed within the metal mold via an injection molding machine, and is characterized by the following technical means.

There is provided a method of manufacturing resin boots for constant velocity universal joint comprising:

a first step of holding an approximately conical resin bellows which is primarily molded so as to be provided with a large diameter side end portion and a large diameter side end portion communicated with an inner space of a bellows-shaped portion in both ends, within a metal mold, and arranging a core mold within the large diameter side end portion of the resin bellows;

a second step of forming a secondary molding space for molding a different thickness portion protruding in an inner diameter direction of the large diameter side end portion between an inner surface of the large diameter side end portion of the resin bellows and an outer peripheral surface of the core mold, or between an outer surface of the large diameter side end portion of the resin bellows and an inner peripheral surface of the metal mold;

a third step of positioning a molten material charging point for the secondary molding at one optional portion or a plurality of optional portions of a thin portion molding space in the secondary molding space; and a fourth step of secondarily molding the different thickness portion on the inner surface of the large diameter side end portion of the primarily molded resin bellows by injecting and charging the molten material into the secondary molding space via the charging point.

As mentioned above, in the case that the molten material charging point for the secondary molding is provided in one optional portion or a plurality of optional portions of the thin portion molding space in the secondary molding space, the thin portion molding space from the injection gate to the thick portion molding space doubles as a part of a runner, and the molten material is fed to the thick portion molding space in a split second with a high speed and a high temperature while maintaining a high temperature state, so that a weld or an air involving is not absolutely generated, and the inner periphery of the bellows large diameter side end portion and the different thickness portion formed by the secondary molding are completely welded.

As the core mold used for forming the secondary molding space between the inner surface of the large diameter side end portion of the resin bellows and the outer peripheral surface of the core mold, as mentioned above, there is used a mold in which a recess portion is formed at a desired position of the outer peripheral surface, and the thick portion is formed between the recess portion and the inner periphery of the large diameter side end portion of the bellows. Further, in the case that a boundary inner surface between the large diameter side end portion and the bellows portion in the resin bellows, and the outer surface of the core mold which is in contact with the boundary inner surface are formed in a fitting shape, a contact force of the portion is increased, an injection pressure at the secondary molding time becomes high, and the inner periphery of the bellows large diameter side end portion and the different thickness portion formed by the secondary molding are firmly welded.

Further, in the case that at least any one of a convex portion and a recess portion is formed on the inner surface of the large diameter side end portion of the resin bellows, the inner periphery of the bellows large diameter side end portion and the different thickness portion formed by the secondary molding are further firmly welded.

Further, in the case that a direction $\theta$ of an injection gate is set to a relation 0 degree $\leq \theta \leq 90$ degree, with respect to the inner surface of the large diameter side end portion of the resin bellows, a position of the injection gate is set to a relation $0 \leq t \leq 2a/3$ in which a distance between the inner surface of the large diameter side end portion of the resin bellows and the injection gate is set to t, and a diametrical distance of the injection side end portion of the secondary molding space is set to a, the molten material is brought into slidable contact with the inner surface of the large diameter side end portion of the resin bellows, and the molten material is charged into the secondary molding space, impurities on the inner surface of the large diameter side end portion of the resin bellows are washed out, and a heat of the molten material is transmitted to the inner surface of the large diameter side end portion of the resin bellows, whereby the inner surface is melted, so that the inner surface of the large diameter side end portion of the resin bellows and the molten material injected into the secondary molding space are welded and completely integrally formed.

Further, since it is possible to secondarily mold in the large diameter side rather than the boundary inner wall mentioned above by forming the secondary molding space close to the large diameter side end portion rather than the boundary inner wall between the large diameter side end portion and the bellows portion, it is possible to prevent a crack from being generated in the periphery of the boundary inner surface due to an expansion, a free movement and the like in the boundary portion between the large diameter side end portion and the bellows portion.

Further, in the case that one or two holes are formed in the thick portion by inserting and arranging one or two pins in the thick portion molding space with an interval and thereafter injecting the molten material, a volume of the thick portion is reduced, so that it is possible to make cooling times for the thin portion and the thick portion coincident or approximate with each other. Further, since a turbulent flow is extremely less generated at a time when the molten resin flows in the thick portion molding space, a weld or an air involving is not absolutely generated.

That is, the following operation and effect are generated, and a sealing property is consequently improved.

Since the volume of the thick portion is reduced, it is possible to intend a weight saving. It is possible to provide a product which has no shrink mark and has an extremely high dimensional accuracy. Further, a band fastening force has no difference between the thin portion and the thick portion, and becomes approximately uniform in all the periphery. Since the thick portion has an elastic force, the thick portion fits to the outer periphery of the tripod joint.

Examples of apparatuses for use in the above-described method include the following. As a first apparatus, there is provided an apparatus for manufacturing resin boots for a constant velocity universal joint holding a primarily molded resin bellows in an injection mold and injecting a molten material into a secondary molding space formed in the mold to secondarily mold a portion having different thicknesses on the inner surface of a large diameter side end portion of the primarily molded resin bellows, the apparatus comprising a split mold holding the primarily molded resin bellows, a core mold inserted into an inner diameter side of the large diameter side end portion of the resin bellows held by the split mold and an injection mechanism which injects/charges a molten material into a secondary molding space constituted of a thick portion molding space and a thin portion molding space formed between the core mold and the large diameter side end portion, or between the split mold and the large diameter side end portion, wherein the injection mechanism positions a molten material injecting point at one or a plurality of optional places of the thin portion molding space in the secondary molding space.

A secondary apparatus is one for manufacturing resin boots for a constant velocity universal joint, wherein a core mold having a concave portion formed in a desired position of the outer peripheral surface is used in the first apparatus.

A third apparatus is one for manufacturing resin boots for a constant velocity universal joint, wherein a boundary inner surface between the large diameter side end portion and the bellows portion of the resin bellows, and the outer surface of the core mold in contact with the boundary inner surface are formed in a fitting shape in either of the first and second apparatuses.

A fourth apparatus is one for manufacturing resin boots for a constant velocity universal joint, wherein the resin bellows forms at least any one of concave portions and convex portions on the inner surface of the large diameter side end portion of the resin bellows in any one of the first to third apparatuses.

A fifth apparatus is one for manufacturing resin boots for a constant velocity universal joint, wherein a direction θ of an injection gage is set to 0°≦θ≦90° with respect to the inner surface of the large diameter side end portion of the resin bellows, assuming that a distance between the inner surface of the large diameter side end portion of the resin bellows and the injection gate center is t and that a diametrical distance of the injection side end portion of the secondary molding space is a, a position of the injection gate is set to 0≦t≦2a/3, a molten material is injected so as to bring the molten material into sliding contact with the inner surface of the of the large diameter side end portion of the resin bellows, and the molten material is charged into the secondary molding space in any one of the first to fourth apparatuses.

A sixth apparatus is one for manufacturing resin boots for a constant velocity universal joint, wherein a boundary point of the portion having different thicknesses which protrudes in the inner diameter direction is disposed in the region extending from the boundary point between the large diameter side end portion and the bellows portion toward the large diameter side end portion so as to form a secondary molding space in any one of the first to fifth apparatuses.

A seventh apparatus is one for manufacturing resin boots for a constant velocity universal joint, wherein one or two pins are inserted/disposed at an interval in the thick portion molding space constituting the secondary molding space, and thereafter the molten material is injected to form one or two holes in the thick portions in any one of the first to sixth apparatuses.

There is further provided resin boots for a constant velocity universal joint manufactured by the use of any one of the first to seventh manufacturing apparatuses.

BRIEF DESCRIPTION OF THE DRAWINGS

FIG.

FIGS. 7A and 7B show a prior art, in which

DESCRIPTION OF THE PREFERRED EMBODIMENT

A description will be given of one embodiment in accordance with the present invention with reference to the accompanying drawings. In this case, the present embodiment only shows one aspect of the present invention, and the present invention is not limited to this embodiment any more, and can be changed in design within the scope of the present invention as occasion demands.

Figure 1:
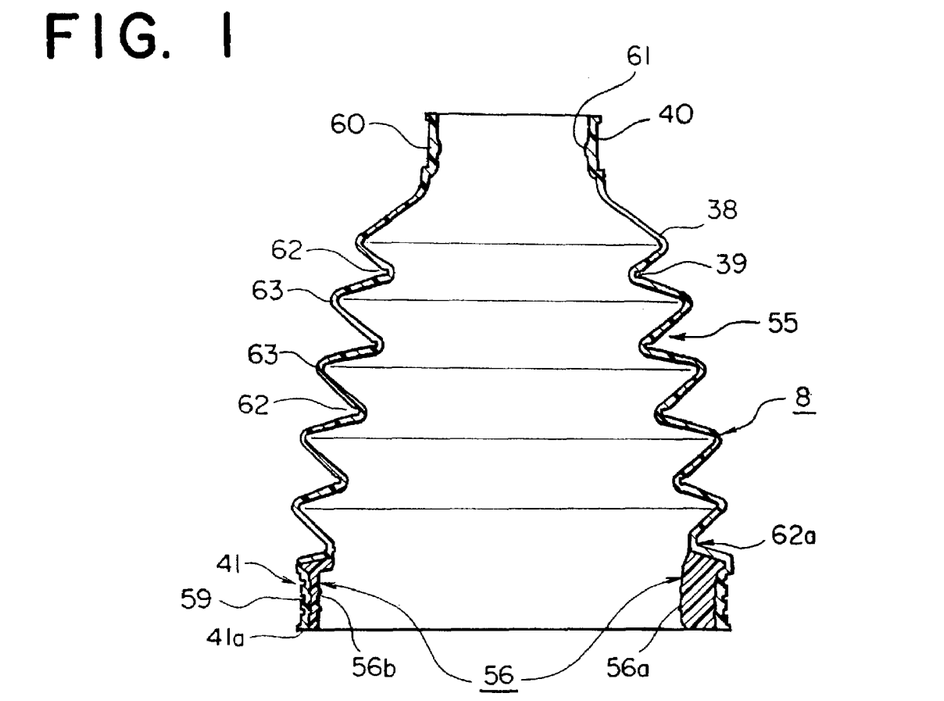
FIG. 1 is a vertical cross sectional view showing one embodiment of resin boots for constant velocity universal joint in accordance with the present invention.
Figure 2:
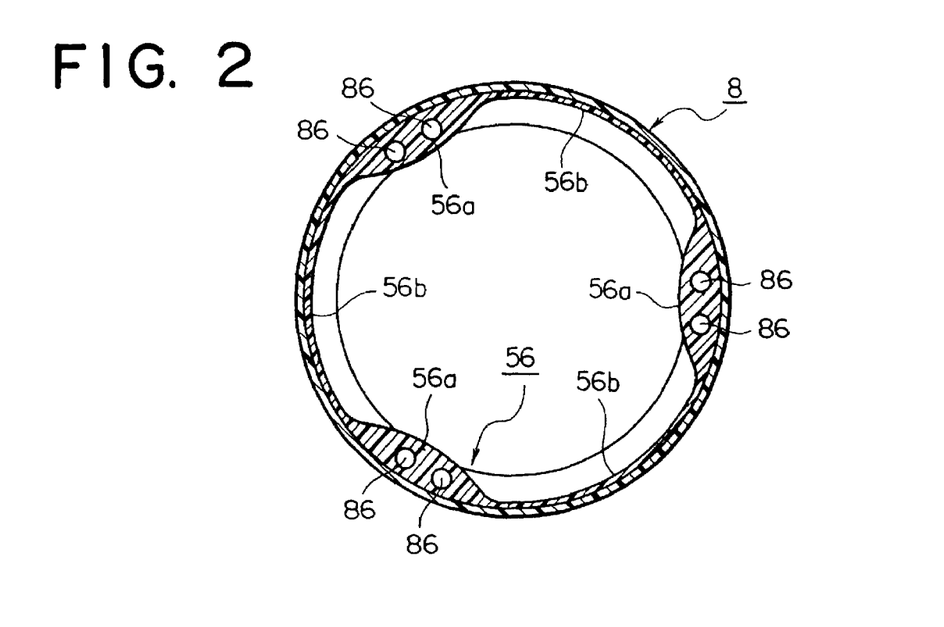
FIG. 2 is a bottom elevational view showing one embodiment of the resin boots for constant velocity universal joint in accordance with the present invention.
Figure 3:
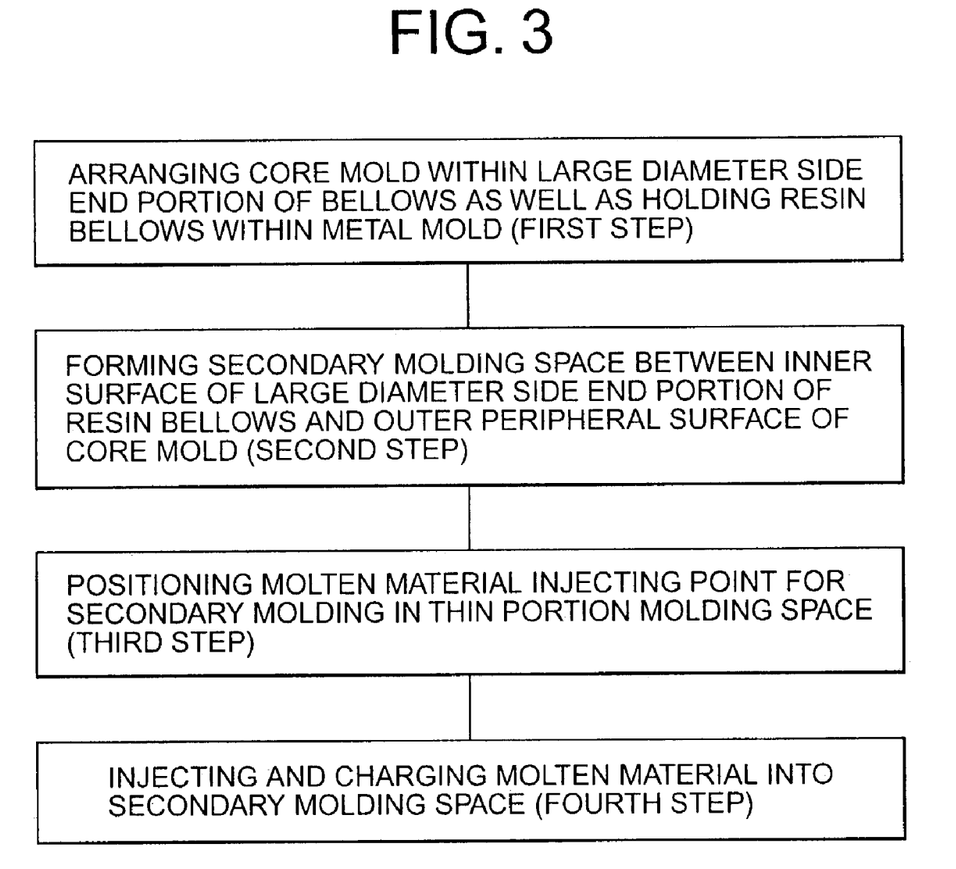
FIG. 3 is a flow chart showing an outline of a secondary molding step.
Figure 4:
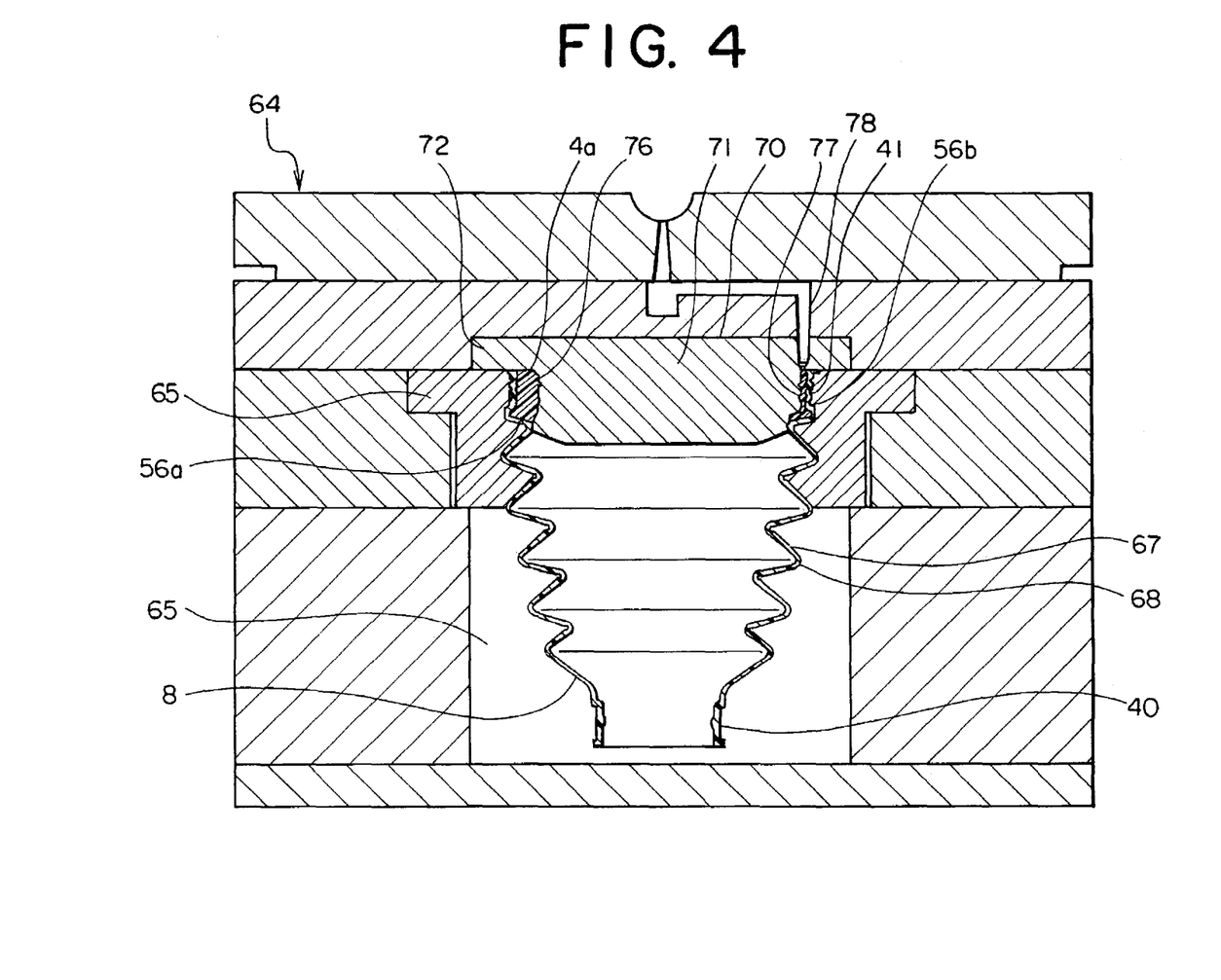
FIG. 4 is a schematic cross sectional view showing one embodiment of the secondary molding step.
Figure 5:
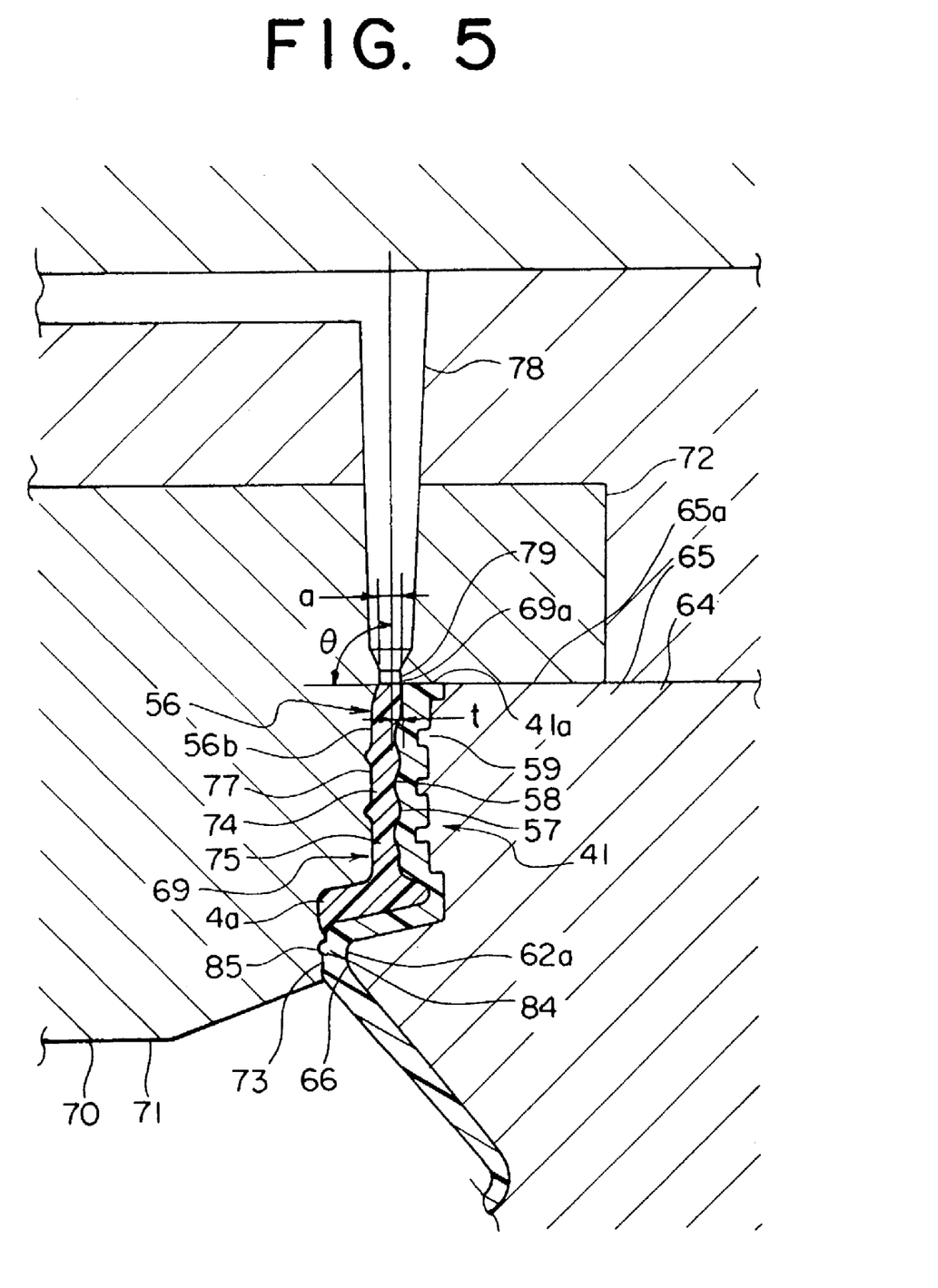
FIG. 5 is an enlarged cross sectional view showing a main portion in FIG. 4.
Figure 6:
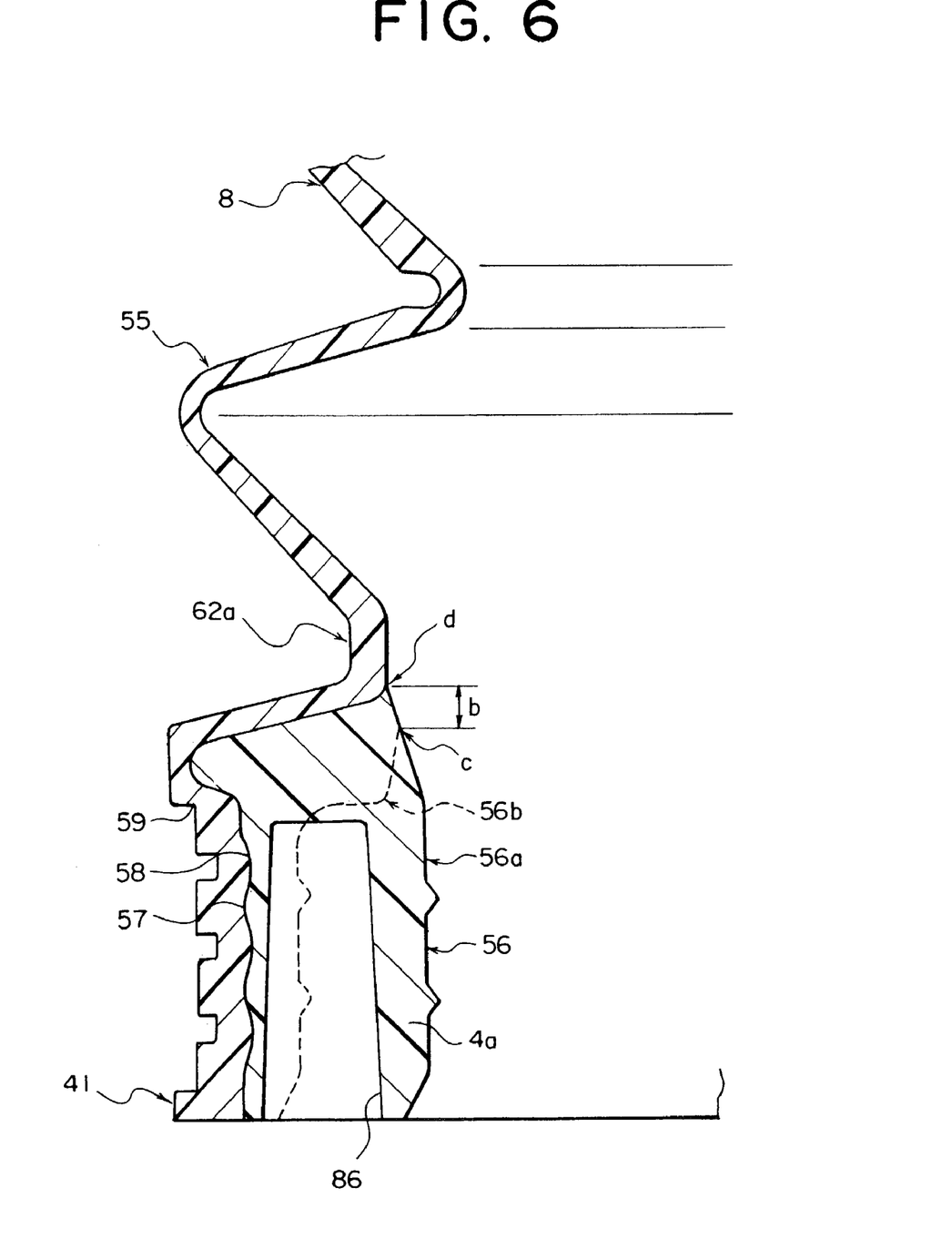
FIG. 6 is an enlarged view showing a secondarily molded large diameter side end portion in a partly omitted manner.

FIG. 1 is a vertical cross sectional view showing one embodiment of resin boots for constant velocity universal joint in accordance with the present invention, FIG. 2 is a bottom elevational view showing one embodiment of the resin boots for constant velocity universal joint in accordance with the present invention, FIG. 3 is a flow chart showing an outline of a secondary molding step, FIG. 4 is a schematic cross sectional view showing one embodiment of the secondary molding step, FIG. 5 is an enlarged cross sectional view showing a main portion in FIG. 4, and FIG. 6 is an enlarged view showing a secondarily molded large diameter side end portion in a partly omitted manner, respectively.

Resin boots for constant velocity universal joint in accordance with the present invention is used in a constant velocity universal joint in which a desired recess portion is formed on an outer peripheral surface, that is, a tripod joint (for example, the tripod joint described in the prior art and shown in FIG. 6).

For example, a boots shown in FIG. 1 is listed up as one aspect, and the boots is constituted by a bellows 8 corresponding to a primarily molded product which is obtained by integrally molding a bellows portion 55 formed in a conical shape, a large diameter side end portion 41 formed in one end side of the bellows portion 55, and a small diameter side end portion 40 formed in another end side by using a thermoplastic resin, and a different thickness portion 56 corresponding to a secondarily molded product which is integrally molded in an inner periphery of the large diameter side end portion 41 of the bellows 8 by using a thermoplastic resin.

First, a description will be given of the bellows 8 corresponding to the primarily molded product. The bellows 8 corresponding to the primarily molded product is obtained by primarily molding the bellows portion 55, the large diameter side end portion 41 and the small diameter side end portion 40 in accordance with a known primary molding step. The large diameter side end portion 41 and the small diameter side end portion 40 are provided in both end sides of the bellows 8 so as to be communicated with an internal space of the bellows-shaped portion 55.

The bellows portion 55 has a desired thickness and is formed in an approximately conical shape structured such that a recess groove portion (also referred to as a valley portion) 62 in which an outer diameter (or an inner diameter) becomes smaller in accordance with being close to the small diameter side end portion 40 from the large diameter side end portion 41, and a convex groove portion (also referred to as a peak portion) 63 are alternately formed.

In this case, in the present invention, the bellows portion 55 is not particularly limited, and an optimum condition can be appropriately applied to terms and conditions such as a thickness of the bellows portion 55, a pitch between the valley portion 62 and the peak portion 63 and the like within the range of the present invention.

In accordance with the present embodiment, the large diameter side end potion 41 is structured such that an outer periphery is formed in an approximately complete round shape and is provided with a recess portion 59 for mounting a fastening device such as a desired shaped band or the like in a periphery, and an inner periphery is provided alternately with a recess-shaped portion 57 and a convex-shaped portion 58 which are continuously provided in a circumferential direction in a direction of height of an end portion, in order to improve a contact force with the different thickness portion 56 corresponding to the secondarily molded product, whereby the inner periphery is formed in a concavo-convex shape.

In accordance with the present embodiment, the small diameter side end potion 40 is structured such that an outer periphery is formed in an approximately complete round shape and is provided with a recess portion 60 for mounting a fastening device such as a desired shaped band or the like in a periphery, and an inner periphery is provided with a convex groove portion 61 fitted to a peripheral recess groove 83 which is formed in an outer periphery of a leading end of a drive shaft in a tripod joint 80 in a circumferential direction.

In this case, in the present embodiment, both of the large diameter side end portion 41 and the small diameter side end portion 40 mentioned above are respectively set to desired uniform thicknesses. These thicknesses are not particularly limited, and an optimum optional thickness is selected.

Terms and conditions of the large diameter side end portion 41 and the small diameter side end portion 40 are not particularly limited, an optimum condition is appropriately applied within the range of the present invention. In this case, in the present embodiment, the thickness of each of the large diameter side end portion 41 and the small diameter side end portion 40 is made uniform, however, the structure in which the thickness is not uniform exists within the range of the present invention.

Next, a description will be given of the different thickness portion 56 corresponding to the secondarily molded product. The different thickness portion 56 corresponding to the secondarily molded product is integrally formed in the inner periphery of the large diameter side end portion 41 in the bellows 8 corresponding to the primarily molded product in accordance with a secondary molding step.

In accordance with the present embodiment, the different thickness portion 56 is constituted by three thick portions 56a and three thin portions 56b which are alternately formed continuously in the inner periphery of the large diameter side end portion 41 of the bellows 8 with a fixed interval in a peripheral direction by using a thermoplastic resin (for example, a polyester thermoplastic elastomer).

In FIG. 6, a solid line portion shows the thick portion 56a, and a broken line portion shows the thin portion 56b. A range shown by reference symbol b in the drawing is a diametrically thickness common portion in each of the portions and has the same thickness in a circumferential direction. Further, a position shown by reference symbol c in the drawing shows a boundary point in the diametrical thickness between the thick portion 56a and the thin portion 56b.

The thick portion 56a is formed in a convex shape which is closely contacted with and fitted to the recess portion 81 formed in the outer periphery of the tripod joint 80, and in the present embodiment, is formed in an R-shaped convex shape expanding by a desired height in a inner diametrical direction from the thin portion 56b. A depth of this thick portion 56a (the boundary point in the diametrical thickness between the thick portion 56a and the thin portion 56b) is up to an inner wall just before position d (close to the large diameter side end portion rather than an inner wall of a boundary 62a) of the boundary 62a between the large diameter side end portion 41 of the bellows 8 and the bellows portion 55.

The thin portion 56b is formed by a curved surface having an inner diameter which is closely contacted with the outer periphery 82 except the recess portion 81 of the tripod joint 80.

That is, when the boundary point c between the end edge (depth) close to the direction of the small diameter side end portion 40 of the thick portion 56a and the inner surface of the thin portion 56b comes to the inner wall of the boundary 62a between the large diameter side end portion 41 and the bellows portion 55, there is a high risk that a crack is generated due to a stress generated in the periphery of the inner surface of the boundary 62a, on the basis of the expansion, the free movement and the like in the portion of the boundary 62a. Accordingly, the boundary point c is set such as not to be positioned in the inner wall of the boundary 62a mentioned above or the inner wall close to the small diameter side end portion over the inner wall of the boundary 62a.

Terms and conditions such as a shape, a number, a thickness, a width, a depth and the like of the thick portion 56a and the thin portion 56b can be appropriately changed in correspondence to an outer peripheral shape of the tripod joint to be subjected.

Further, in the present embodiment, as shown in FIGS. 2 and 6, two non-penetrating holes (recess portions) 86 are provided in an axial direction of the thick portion 56a, thereby intending to achieve a weight saving, a shrinkage prevention and an improvement of elasticity.

In this case, one or two holes 86 are provided in all of the thick portions. Further, in the present embodiment, the hole 86 is provided in all of the thick portions, however, may be provided in optionally selected thick portions. Further, in the present embodiment, the hole is formed in the frustum shape which has a complete round shape in a cross sectional view and has the diameter smaller in accordance with going in the depth direction (the direction of the small diameter side end portion), however, it is possible to select any optional shape such as an oval shape in a cross sectional view, a tear drop shape in a cross sectional view or the like, and it is possible to change in design within the range of the present invention.

The thermoplastic resin for structuring the bellows 8 corresponding to the primarily molded product and the different thickness portion 56 corresponding to the secondarily molded product is not particularly limited, an optimum material within the range of the present invention is selected, and whichever they are made of the same material, materials having different hardness or different materials, they are within the range of the present invention. In this case, the different thickness portion 56 corresponding to the secondarily molded product is preferably made of a material having a seal function of preventing the grease from leaking, and on the other hand, the bellows 8 corresponding to the primarily molded product can select a material which purely corresponds to an inherent object, that is, a material having a bending property, a heat resistance, a cold resistance and the like.

In this case, in accordance with the present invention, the structure may be made such that only a desired number of thick portions 56a are provided in desired portions in the inner periphery of the primarily molded resin bellows 8. In accordance with this structure, the different thickness portion is structured by the thick portion 56a, and the inner surface (the thin portion) of the large diameter side end portion 41 of the resin bellows 8 exposing without providing with the thick portion 56a. At this time, for example, since the end portion of each of the thick portions 56a is thin, it is possible to set this to the thin portion molding space and it is possible to position the charging point of the molten material to the space.

Next, a description will be given of one embodiment of a method of manufacturing the boots for resin constant velocity universal joint in accordance with the present invention.

Primarily molding step

As a method of molding the resin bellows 8 in which the thickness of the large diameter side end portion 41 mentioned above is uniform, a blow molding, an injection blow molding and the like are well known, however, the method is not particularly limited, and an optimum bellows molding method is appropriately employed within the range of the present invention.

Secondarily molding step

The present step is a secondarily molding step of integrally molding the different thickness portion 56 corresponding to the secondarily molded product in the inner periphery of the large diameter side end portion 41 of the bellows 8 by holding the primarily molded resin bellows 8 within the injection molding metal mold 64, and injecting a desired molten material, for example, a thermoplastic resin 4a having a high temperature equal to or more than 260° C. within the metal mold 64 at a high speed. A description will be given of one embodiment thereof with reference to FIGS. 4 to 6. In this case, since the known structures are applied to the other structures than the structure described below, a description thereof will be omitted. In this case, the injected thermoplastic resin has the temperature equal to or more than 260 degrees, however, the resin is not particularly limited, and can be appropriately changed in design within the range in which the raw material is not changed.

The particular step is constituted, as shown in FIG. 3, by a first step of holding an approximately conical resin bellows which is primarily molded so as to be provided with a large diameter side end portion and a large diameter side end portion communicated with an inner space of a bellows-shaped portion in both ends, within a metal mold, and arranging a core mold within the large diameter side end portion of the resin bellows, a second step of forming a secondary molding space for molding a different thickness portion protruding in an inner diameter direction of the large diameter side end portion between an inner surface of the large diameter side end portion of the resin bellows and an outer peripheral surface of the core mold, or between an outer surface of the large diameter side end portion of the resin bellows and an inner peripheral surface of the metal mold, a third step of positioning a molten material charging point for the secondary molding at one optional portion or a plurality of optional portions of a thin portion molding space in the secondary molding space, and a fourth step of secondarily molding the different thickness portion on the inner surface of the large diameter side end portion of the primarily molded resin bellows by injecting and charging the molten material into the secondary molding space via the charging point.

The injection molding metal mold 64 forms a resin bellow placing space 68 coinciding with an outer appearance shape (an outer profile) of the resin bellows 8 by a desired split mold 65 constituting the metal mold 64, forms a desired secondarily molding space 69 with respect to the inner periphery of the large diameter side end portion 41 of the bellows 8 by inserting and fitting a core mold 70 to the primarily molded resin bellows 8 mentioned above, and thereafter insert holds the resin bellows 8 and the core mold 70 in the resin bellows placing space 68 of the split mold 65 so as to clamp the mold. In this case, it is possible to employ a step of previously holding the resin bellows 8 as well as inserting to the resin bellows placing space 68, forming a desired secondarily molding space 69 with respect to the inner periphery of the large diameter side end portion 41 of the bellows 8 so as to insert and arrange the core mold 70, and thereafter clamping the mold. This step is within the range of the present invention.

The resin bellows placing space 68 forms a profile in which the outer appearance shape of the resin bellows 8 is closely contacted with an inner surface at a time of clamping the mold, and is formed in such a manner that an opening edge 41a of the large diameter side end portion 41 of the resin bellows 8 is flush with an upper end surface 65a of the split mold 65.

The core mold 70 is constituted by an approximately cylindrical core portion 71 inserted into an inner periphery of the large diameter side end portion 41 of the bellows 8, and a disc-like collar portion 72 extended in a horizontal direction from an upper end of the core portion 71, and forms an outer peripheral shape of the tripod joint 80 to be subjected, the same outer peripheral shape as the outer diameter and a portion corresponding to the outer diameter in an outer peripheral portion 74 between an outer periphery 73 closest to a leading end side of the core portion 71 and the collar portion 72. Further, when the collar portion 72 is brought into contact with the upper end surface 65a of the split mold 65 so as to seal the above side of the secondary molding space 69, and the outer peripheral portion 74 of the core portion 71 is inserted, the bellows valley portion 62a closest to the large diameter side end portion 41 in the resin bellows 8 is clamped by the outer periphery 73 closest to the leading end side of the outer peripheral portion 74 and the peak portions 66 of the opposing split molds 65.

The secondary molding space 69 formed by inserting the outer peripheral portion 74 of the core portion 71 to the inner periphery of the large diameter side end portion 41 of the bellows 8 is formed as a desired space by the outer peripheral shape of the core portion 71 and the inner peripheral shape of the large diameter side end portion 41.

In accordance with the present embodiment, since three recess portions 75 are formed in the outer peripheral portion of the core portion 71 with a fixed interval, a thick portion molding space 76 is formed between the recess portion 75 and the inner periphery of the large diameter side end portion 41 of the bellows 8, and a thin portion molding space 77 communicating with the thick portion molding space 76 is formed between the other outer periphery than the recess portion 75 and the inner periphery of the large diameter side end portion 41 of the bellows 8.

That is, when the boundary point c between the end edge (depth) close to the direction of the small diameter side end portion 41 of the thick portion 56a and the inner surface of the thin portion 56b comes to the boundary 62a between the large diameter side end portion 41 and the bellows portion 55, there is a high risk that the crack is generated due to the stress generated in the periphery of the inner surface of the boundary 62a, on the basis of the expansion, the free movement and the like in the portion of the boundary 62a. Accordingly, the boundary point c is set such as not to be positioned in the inner wall of the boundary 62a mentioned above or the inner wall close to the small diameter side end portion over the inner wall of the boundary 62a.

Further, the sprue is provided with projections (not shown) for forming one or two holes 86 arranged in the thick portion 56a at desired positions (three positions in the present embodiment) of the collar portion 72 with a fixed interval. Accordingly, the hole 86 can be formed at the same time of the secondary molding.

A gate 79 for injecting the thermoplastic resin into the secondary molding space 69 via a sprue 78 is formed in the collar portion 72.

In the present embodiment, the gate 79 is selectively provided in one optional position or a plurality of optional positions of the thin portion molding space. That is, when the thermoplastic resin injecting (charging) point for secondary molding is provided in one optional position or a plurality of optional positions of the thin portion molding space in the secondary molding space, the thin portion molding space from the injection gate to the thick portion molding space doubles as a narrow runner, and the molten material is fed to the thick portion molding space under the high speed and the high temperature in a split second while maintaining the high temperature state, so that there is not generated the problem such as the air defect, the weld defect and the like at all.

In this case, the structure may be made such that the gate 79 is provided in the thick portion molding space, and the thermoplastic resin is injected from only the thick portion molding space or from a plurality of portions including the thick portion molding space, however, in view of preventing the air defect, the weld defect and the like, it is preferable that the gate 79 is provided in the thin portion molding space as in the present embodiment.

When the inner surface of the boundary 62a between the large diameter side end portion 41 of the resin bellows 8 and the bellows portion 55, and the outer periphery 73 closest to the leading end side of the core portion 71 which is in contact with the inner surface of the boundary 62a are formed so as to be fitted to each other, a self-seal effect caused by the injection pressure is generated as well as the contact force of that portion is increased, so that it is possible to increase the injection pressure of the thermoplastic resin 4a at a time of the secondary molding. Accordingly, it is possible to firmly weld the inner periphery of the large diameter side end portion 41 of the bellows 8 to the different thickness portion 56 formed by the secondary molding.

For example, in the present embodiment, a convex groove portion 84 continuously provided in a peripheral direction is integrally molded on the inner surface of the boundary 62a between the large diameter side end portion 41 of the resin bellows 8 and the bellows portion 55, and a recess groove portion 85 opposing to the convex groove portion 84 on the inner surface of the boundary 62a is continuously formed in the peripheral direction in the outer periphery 73 closest to the leading end side of the core portion 71, thereby increasing the contact force on the basis of the fitting between the convex groove portion 84 and the recess groove portion 85. In this case, in reverse to the present embodiment, the structure may be made such that the recess groove portion continuously provided in the peripheral direction is integrally formed on the inner surface of the boundary 62a between the large diameter side end portion 41 of the resin bellows 8 and the bellows portion 55 at a time of the primary molding, and on the other hand, the convex groove portion opposing to the recess groove portion on the inner surface of the boundary 62a is formed continuously in the peripheral direction in the outer periphery 73 closest to the leading end side of the core portion 71. Accordingly, it is possible to appropriately change design within the range of the present invention as far as the structure can increase the contact force between both of the elements.

Further, when forming at least any one of the convex portion and the recess portion on the inner surface of the large diameter side end portion 41 of the resin bellows 8 at the same time of the primary molding mentioned above, it is possible to firmly weld to the different thickness portion 56 corresponding to the secondarily molded product.

For example, in accordance with the present embodiment, since a plurality of recess portions 57 and convex portions 58 which are continuously provided in the peripheral direction are alternately arranged in the height direction of the inner surface of the large diameter side end portion 41, it is possible to increase a welding area between the inner surface of the large diameter side end portion 41 of the resin bellows 8 corresponding to the primarily molded product and the different thickness portion 56 corresponding to the secondarily molded product, and it is possible to firmly weld the both. In this case, in accordance with the present embodiment, the structure is made such that a plurality of recess portions 57 and convex portions 58 are provided, however, the structure is not limited to this as far as the structure can achieve a firm welding as mentioned above. For example, it is possible to consider that one or a plurality of independent projections or recesses are provided, and in this case, a length of the projection can be optionally set.

Further, in the case that the convex portion 58 extending in the peripheral direction is formed on the inner surface of the large diameter side end portion 41 of the resin bellows 8, the convex portion 58 doubles as a dam, and serves an operation of uniformly flowing the thermoplastic resin injected from the gate 79 to the thin portion molding space from the thin portion molding space to the thick portion molding space. That is, in the case of forming the convex portion as the dam, the high speed and high temperature thermoplastic resin injected to the thin portion molding space first flows in the direction of the thick portion molding space along a drift space (a drift space above the convex portion 58) between the gate 79 and the convex portion 58, subsequently flows into a drift space below the convex portion 58, and flows so as to follow along the drift space. Further, the thermoplastic resins flowing along the respective drift spaces reach the thick portion molding space at the same time. It is preferable to adjust the height and the length of the convex portion so that the thermoplastic resins flowing to a plurality of drift spaces can reach the thick portion molding space at the same time.

In this case, it is sufficient that the convex portion 58 is formed at least on the inner surface of the large diameter side end portion 41 corresponding to the thin portion molding space. Further, the convex portion 58 is optionally provided in the present invention, and the number of the convex portions can be appropriately changed in design.

It is possible to further firmly weld the resin bellows 8 corresponding to the primarily molded product to the different thickness portion 56 corresponding to the secondarily molded product by setting the injection condition of the thermoplastic resin 4a into the secondary molding space 69 as follows.

That is, a direction θ of the injection gate 79 is set under a condition 0 degree $\leq \theta \leq$ 90 degree, with respect to the inner surface of the large diameter side end portion 41 of the resin bellows 8, a position condition of the injection gate 79 is set to a condition $0 \leq t \leq 2a/3$ in which a distance between the inner surface of the large diameter side end portion 41 of the resin bellows 8 and the injection gate 79 is set to t, and a diametrical distance of the injection side end portion 69a of the secondary molding space 69 is set to a.

Accordingly, the high temperature thermoplastic resin 4a is injected so as to be brought into slidable contact with the inner surface of the large diameter side end portion 41 of the resin bellows 8, and the thermoplastic resin 4a is charged into the secondary molding space 69.

At this time, since the injected high temperature thermoplastic resin 4a flows so as to be brought into slidable contact with the inner periphery of the large diameter side end portion 41 at a high speed, impurities attached on the surface of the inner periphery of the large diameter side end portion 41 are washed out, and a heat of the thermoplastic resin 4a flowing at the high temperature and high speed is transmitted to the surface of the inner periphery, thereby melting the inner surface. Therefore, the injected thermoplastic resin 4a is firmly welded to the surface of the large diameter side end portion 41 which is melted by the heat of the thermoplastic resin 4a, and the different thickness portion 56 is integrally molded in the inner periphery of the large diameter side end portion 41 in accordance with the secondary molding.

Further, in accordance with the present embodiment mentioned above, the secondary molding is applied to the inner periphery of the large diameter side end portion 41, however, it is possible to achieve the same object by applying the secondary molding on the outer surface of the large diameter side end portion 41. That is, the structure is made such as to include the steps of previously forming the large diameter side end portion as an inner surface shape (a concavo-convex shape in the peripheral direction) corresponding to the tripod at a time of primarily molding the resin bellows 8, placing the primarily molded resin bellows within the metal mold, inserting a core mold provided with a concavo-convex outer surface shape coinciding with the inner surface shape of the concavo-convex formed large diameter side end portion into the large diameter side end portion, and forming the secondary molding space between the outer surface of the large diameter side end portion and the inner surface of the metal mold so as to clamp the mold. Further, the large diameter side end portion in which the outer peripheral surface is formed in the complete round shape and the inner peripheral surface has a different thickness is integrally molded by thereafter injecting the thermoplastic resin into the secondary molding space formed between the outer surface of the large diameter side end portion and the inner surface of the metal mold. In this case, the injection point condition by the gate 79 and the other conditions can be set in the same manner as the present embodiment mentioned above. In accordance with this manufacturing method, since the primarily molded weld portion corresponds to the outer side of the resin bellows, there is no fear that the grease within the boots leaks even if the weld defect is generated.

Since the present invention is structured as mentioned above, it is possible to provide the method of manufacturing resin boots for constant velocity universal joint for integrally molding the different thickness portion in the inner periphery of the large diameter side end portion of the primarily molded bellows in accordance with the secondary molding, and the manufacturing apparatus used for the method. That is, in accordance with the present invention, it is possible to provide resin boots for constant velocity universal joint in which the different thickness portion firmly welded and integrally formed with the inner surface of the large diameter side end portion of the resin bellow can be secondarily molded, it is possible to solve the problem of the grease leakage, and it is possible to improve an assembling operability.

What is claimed is:

1. A method of manufacturing a resin boot for a constant velocity universal joint, comprising:
    preparing a bellows that has a conical shape with a hollow space and has a first opening at a large diameter side end portion and a second opening at a small diameter side end portion;
    forming an injection space between an inner periphery of the large diameter side end portion and a core mold, the core mold having an outer periphery opposed to the inner periphery, the outer periphery having a plurality of first concave portions circumferentially disposed at regular intervals, the injection space having a plurality of narrow spaces between the adjacent first concave portions and a plurality of wide spaces continuously formed with the plurality of narrow spaces, corresponding to each of the plurality of first concave portions;
    injecting a molten material from a plurality of injection gates to the injection space, each of the plurality of injection gates corresponding to each of the plurality of narrow spaces;
    allowing the injected molten material to flow from each of the plurality of injection gates through each of the plurality of narrow spaces to two of the plurality of wide spaces continuously adjacent in a circumferential direction to each of the plurality of narrow spaces, and to interflow in each of the plurality of wide spaces; and
    hardening the molten material to be integrally formed with the inner periphery of the large diameter side end portion,
    wherein a position of each of the plurality of injection gates is set to $0 \leq t \leq 2a/3$ in which a distance between the inner periphery of the large diameter side end portion of the bellows and the injection gate is set to t, and a diametrical distance of the large diameter side end portion of the injection space is set to a.

2. The method according to claim 1,
    wherein the first opening side of the injection space is blocked by a wall portion, and
    wherein the molten material is injected from each of the plurality of injection gates provided to the wall portion to the injection space in the injecting step.

3. The method according to claim 1,
    wherein the core mold includes a second concave portion continuously formed in a circumferential direction at a first position in contact with the bellows in the vicinity of an end portion of an outer periphery thereof,
    wherein the bellows includes a convex portion continuously formed in a circumferential direction at a second position corresponding to the second concave potion, and
    wherein the step of forming the injection spaces includes the step of fitting the convex portion into the second concave portion.

4. The method according to claim 1,
    wherein a direction θ of each of the plurality of injection gates for the molten material is set to 0 degrees $\leq \theta \leq 90$ degrees, with respect to the inner periphery of the large diameter side end portion of the bellows.

5. A method of manufacturing a resin boot for a constant velocity universal joint, comprising:
    preparing a bellows that has a conical shape with a hollow space and has a first opening at a large diameter side end portion and a second opening at a small diameter side end portion;
    forming an injection space between an inner periphery of the large diameter side end portion and a core mold, the core mold having an outer periphery opposed to the inner periphery, the outer periphery having a plurality of first concave portions circumferentially disposed at regular intervals, the injection space having a plurality of narrow spaces between the adjacent first concave portions and a plurality of wide spaces continuously formed with the plurality of narrow spaces, corresponding to each of the plurality of first concave portions;
    injecting a molten material from a plurality of injection pates to the injection space, each of the plurality of injection pates corresponding to each of the plurality of narrow spaces;

allowing the injected molten material to flow from each of the plurality of injection gates through each of the plurality of narrow spaces to two of the plurality of wide spaces continuously adjacent in a circumferential direction to each of the plurality of narrow spaces, and to interflow in each of the plurality of wide spaces; and hardening the molten material to be integrally formed with the inner periphery of the large diameter side end portion, wherein a direction $\theta$ of each of the plurality of injection gates for the molten material is set to 0 degrees $\leqq \theta \leqq 90$ degrees, with respect to the inner periphery of the large diameter side end portion of the bellows.

* * * * *

UNITED STATES PATENT AND TRADEMARK OFFICE
CERTIFICATE OF CORRECTION

PATENT NO. : 7,588,713 B2
APPLICATION NO. : 10/396520
DATED : September 15, 2009
INVENTOR(S) : Kazuhiko Sueoka et al.

It is certified that error appears in the above-identified patent and that said Letters Patent is hereby corrected as shown below:

Column 14, Line 65:
"pates" should read -- gates --.

Column 14, Line 66:
"pates" should read -- gates --.

Signed and Sealed this

Twenty-fourth Day of November, 2009

David J. Kappos
*Director of the United States Patent and Trademark Office*